US010706377B2

(12) United States Patent
Harris

(10) Patent No.: US 10,706,377 B2
(45) Date of Patent: Jul. 7, 2020

(54) COMMUNICATION DATA ANALYSIS AND PROCESSING SYSTEM AND METHOD

(71) Applicant: JPMorgan Chase Bank, N.A., New York, NY (US)

(72) Inventor: William V. Harris, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 906 days.

(21) Appl. No.: 14/264,081

(22) Filed: Apr. 29, 2014

(65) Prior Publication Data

US 2014/0324517 A1 Oct. 30, 2014

Related U.S. Application Data

(60) Provisional application No. 61/817,387, filed on Apr. 30, 2013.

(51) Int. Cl.
*G06Q 10/06* (2012.01)
(52) U.S. Cl.
CPC .......... *G06Q 10/0633* (2013.01); *Y02P 90/86* (2015.11)
(58) Field of Classification Search
CPC .. G06F 3/0237; G06F 17/276; G06F 17/2785; G10L 15/22
See application file for complete search history.

(56) References Cited

U.S. PATENT DOCUMENTS

| 2005/0209876 A1 | 9/2005 | Kennis et al. |
| 2007/0294271 A1 | 12/2007 | Bammi et al. |
| 2010/0153336 A1* | 6/2010 | Zak ...................... H04L 67/1095 707/610 |
| 2011/0047525 A1* | 2/2011 | Castellanos ........... G06F 9/4494 717/104 |
| 2011/0055309 A1 | 3/2011 | Gibor et al. |
| 2012/0011159 A1 | 1/2012 | Gillette et al. |
| 2012/0089562 A1 | 4/2012 | Deremigio et al. |

(Continued)

OTHER PUBLICATIONS

Vorgrimler, Disclosure Risk of Anonymized Business Microdata File-Illustrated with Empirical Key Variables, 2003, International Statistical Institute, 54th session (Year: 2003).*

(Continued)

*Primary Examiner* — Hafiz A Kassim
*Assistant Examiner* — Zahra Elkassabgi
(74) *Attorney, Agent, or Firm* — Greenblum & Bernstein, P.L.C.

(57) ABSTRACT

Systems and methods are provided for assessing risks and efficiencies based on enterprise communications information. A method for assessing risks and efficiencies based on enterprise communications information may include: collecting information from digital data tools over at least one computer network into a storage database in a computer memory; executing instructions on a computer processor to synthesize the employee communications data into structured data; mining the structured data to generate exploratory data; performing analytics on the structured data to generate confirmatory data; disambiguating the confirmatory data and exploratory data; determining a business impact based on the exploratory and confirmatory data; and implementing a business process based on a quantification of said business impact.

22 Claims, 7 Drawing Sheets

(56) References Cited

U.S. PATENT DOCUMENTS

2012/0221370 A1\* 8/2012 Ostertag .......... G06Q 10/06311
   705/7.23
2012/0221485 A1\* 8/2012 Leidner .............. G06Q 10/0635
   705/36 R

OTHER PUBLICATIONS

International Search Report dated Sep. 9, 2014.

\* cited by examiner

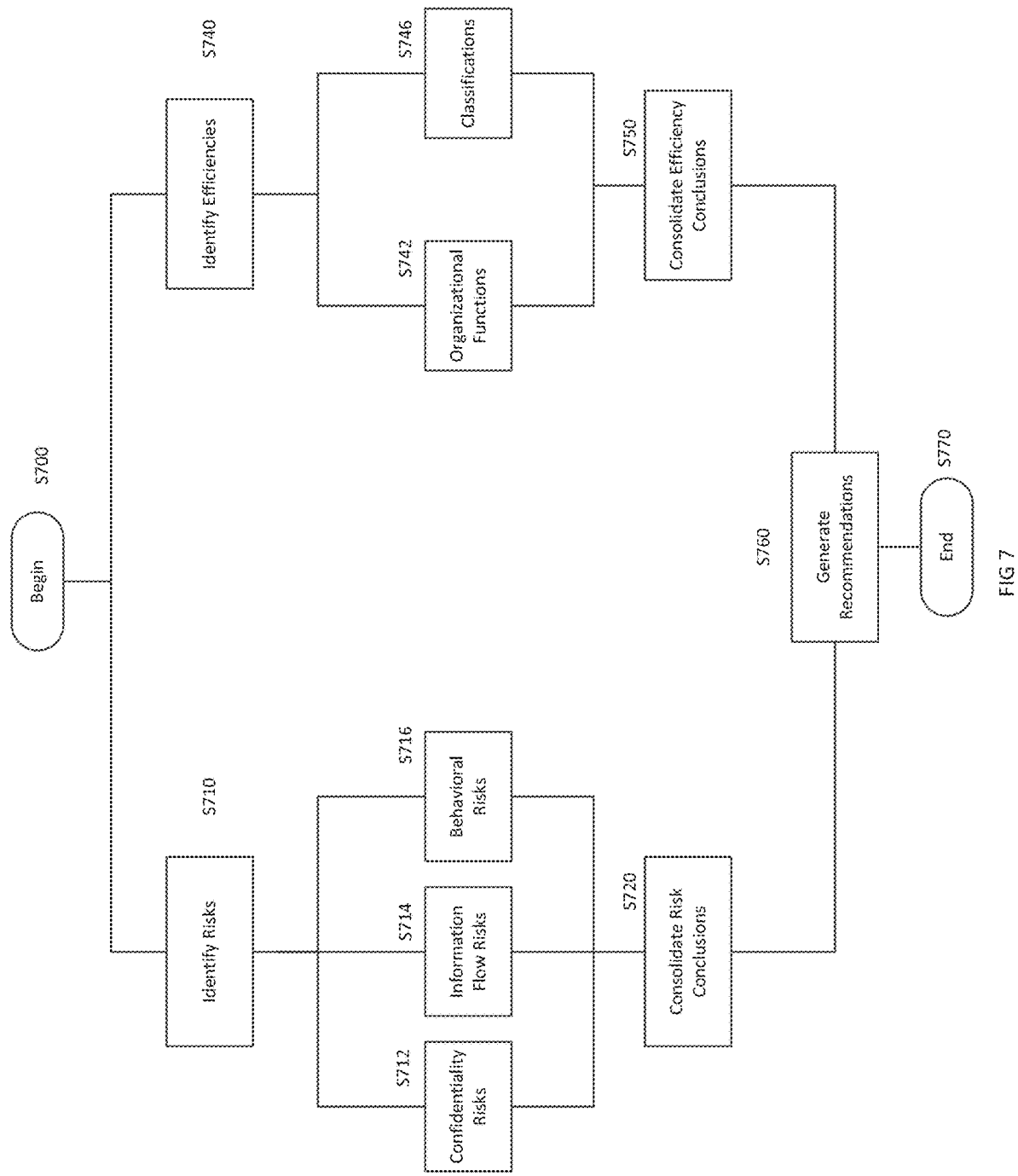

COMMUNICATION DATA ANALYSIS AND PROCESSING SYSTEM AND METHOD

RELATED APPLICATIONS

This application claims priority to and fully incorporates by reference, U.S. Provisional Patent Application Ser. No. 61/817,387, filed on Apr. 30, 2013.

FIELD OF THE INVENTION

The present invention relates generally to the field of data collection and analysis, and more particularly, to the field of analyzing enterprise communications information across various information systems to identify and document efficiency improvement and risk mitigation.

BACKGROUND

To meet the needs that many enterprises face today, enterprises typically have numerous departments, intricate hierarchies, and complex business process flows. Because the objectives, needs, and resources of a business may change over time, enterprises usually adopt review procedures for evaluating inefficiencies in their structure, hierarchy, and process flows. Traditionally, enterprises review these aspects of their businesses with basic tools and simple methodologies. For example, enterprises will typically circulate paper or electronic surveys to enterprise employees, or hold in-person interviews to gather information. This information is then usually reviewed manually. For large-scale enterprises that employ hundreds of employees, collecting and reviewing information in this manner is infeasible and overly time- and resource-intensive.

Instead of gathering information from employees using traditional methodologies and procedures (e.g., holding interviews or circulating surveys), information can be gathered and reviewed from an employee's digital data tools. Enterprises today often provide their employees with a plethora of digital data tools that enable employees to connect and communicate information with each other. Towards this end, employees generally use these digital data tools to share and exchange different types of information. Though these digital data tools are often intended to facilitate communication between employees, the information conveyed in these exchanges between employees may also be used for evaluating and improving different aspects of an enterprise. For example, the content of e-mail exchanges between employees may be used to understand the hierarchy or process flow between two employees. Additionally, the timing, frequency, direction, and metadata associated with these communications can provide additional insight. Because these digital communications are often generated throughout the course of daily business, the nature of these communications typically provides an unfiltered and unbiased view into the actual way that people work, i.e. how business processes are actually implemented, in comparison to how they are planned or expected to work.

While businesses typically retain records of these digital communications in accordance with their IT or security policies, businesses often fail to make use of the data contained in these records. One reason enterprises often neglect or underutilize the information in these digital data tools is because each employee typically uses a number of different data tools that store data in different formats or locations. For large enterprises employing hundreds of employees, the amount of data in differing formats and locations may seem too large for enterprises to aggregate and analyze in an efficient and meaningful way.

Accordingly, a solution is needed for facilitating collection and analysis of employee communications for the benefit of an organization. The solution should preferably reduce risk and enhance efficiency for the organization as a whole.

SUMMARY

Embodiments of the invention relate to a computer-implemented method for reducing organizational risk and optimizing organizational efficiency. The method includes collecting information over a network from digital data sources. The information includes communications information defined by employee communications. The method further includes storing the collected information in a database stored in a computer memory and accessing the computer memory using at least one computer processor. The computer processor executes instructions to perform multiple steps. The steps may include synthesizing the collected information to create structured data, mining the structured data and analyzing the structured data to create exploratory data and confirmatory data and disambiguating the confirmatory data and the exploratory data. The steps may additionally include determining business impacts including organizational risk threats and/or organizational inefficiencies based on the confirmatory and exploratory data; and generating a business process to reduce the organizational risk threats and/or the organizational inefficiencies.

In an additional aspect, a computer-implemented system is provided for reducing organizational risk and optimizing organizational efficiency. The system includes at least one database stored in a computer memory. The database stores information collected over a network from digital data sources. The information includes communications information defined by employee communications. The system additionally includes at least one computer processor accessing the computer memory and executing instructions to perform multiple steps. The steps include synthesizing the collected information to create structured data, mining the structured data and analyzing the structured data to create exploratory data and confirmatory data, and disambiguating the confirmatory data and the exploratory data. The steps additionally include determining business impacts including organizational risk threats and/or organizational inefficiencies based on the confirmatory and exploratory data and generating a business process to reduce the organizational risk threats and/or the organizational inefficiencies.

BRIEF DESCRIPTION OF THE DRAWINGS

The present invention is described in detail below with reference to the attached drawings:

FIG. 7 is a flow chart illustrating embodiments of risk and efficiency evaluation.

DETAILED DESCRIPTION OF PREFERRED EMBODIMENTS

Embodiments of the invention are directed to systems and methods for assessing risks and inefficiencies based on enterprise communications information. Unstructured communications information from different digital data tools is collected from different data sources and combined into a single structured data set. Data from the structured data set may be mined to generate exploratory data that reveals hidden patterns and relationships. Analytics may be performed on either the exploratory data, the structured data set, or both, to generate confirmatory data that suggests hypotheses, outliers, patterns between input and output variables. Ambiguities in the exploratory and confirmatory data are then eliminated. The impact of the exploratory data and confirmatory data on the enterprise, such as whether there are any enterprise risks or inefficiencies, is determined. Business processes are automatically implemented based on these business impacts.

Figure 1:
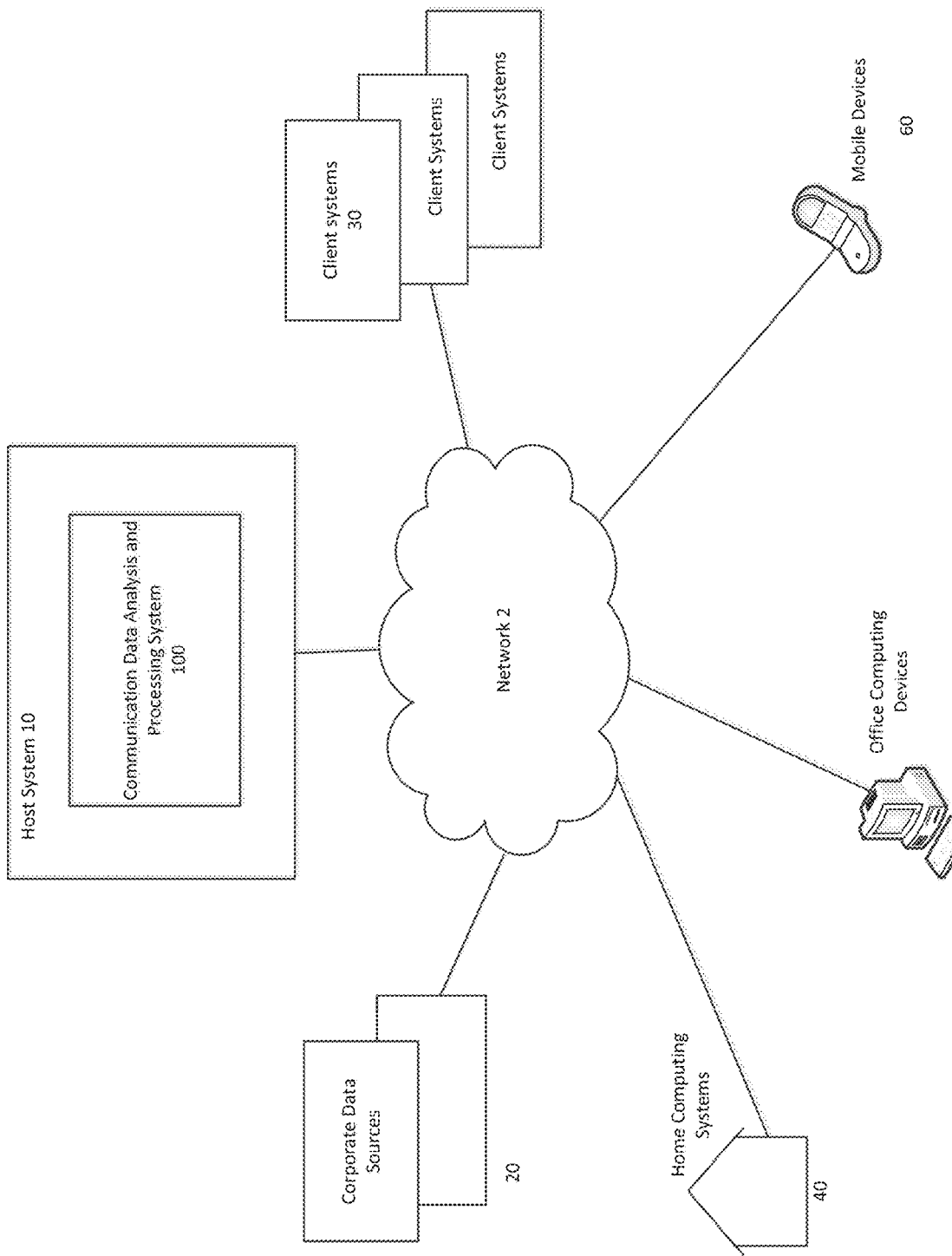
FIG. 1 is a block diagram illustrating an operating environment for operation of the system with an embodiment of the invention.

FIG. 1 is a block diagram illustrating an operating environment for operation of a communication data analysis and processing system 100 in accordance with an embodiment of the invention. The communication data analysis and processing computing system 100 may operate through or in collaboration with a host server 10 and is connected over one or more networks 2 with various systems and devices. The devices and systems may include, for example, corporate data sources 20, home computing systems 40, office computing systems and devices 50, mobile devices 60, and client systems 30. These source and destination systems that interact with the communication data analysis and processing system 100 are merely exemplary. Additional systems or devices may be included in the operating environment.

The host server 10 may operate and administer multiple corporate computing systems and applications for internal corporate and external users. The host server 10 can host web sites, files, images, games and similar content. The host server 10 can be shared among many clients or dedicated to a single client.

The network 2 is preferably the Internet, but may be or include other types of networks. Furthermore, even though only one network is shown, multiple networks may be used. For example, corporate data sources 20 may communicate over a different network with the communication data analysis and processing computing system 100 than the client systems 30. The network 2 may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The corporate data sources 20 may encompass any data sources available within a corporate environment. These data sources may be or include applications running on the host server 10 or on employee digital devices 40, 50, 60. For example, the corporate data sources 20 may include direct sources for communications data including core applications or systems such as email systems, voicemail systems, chat or instant messaging systems such as Communicator™, video conference systems such as WebEx™ or Tandberg™, and calendar sharing applications. The corporate data sources may also include social or indirect data including collaboration data sources such as internal networks or forums such as IntraConnect™, external networks or forums such as LinkedIn™, collaborative tools or publishing systems such as Adobe Connect™, contact lists and distribution lists. The corporate data sources 20 may also include systems that provide data such as organizational information, employee information, access rights, location data, surveys, system usage data, embedded monitoring data, and data pertaining to governance structures. The corporate data sources 20 may also include other unstructured sources such as single-sign on login sources and may include applications tracking external and internal email activity to or from a corporate email address. Furthermore, systems connected to a desktop computer in the office which require login/logout and screen save lock/unlock may be utilized to gather data.

The client systems 30 may include computing systems adapted to utilize visualizations, reports and recommendations from the communication data analysis and processing system 100. The client systems 30 may be operated by a line of business, by consultants, or by resource managers within a corporation. Client systems 30 may include at least one processor and multiple applications executed by the processor capable of performing desired functions to interact with the communication data analysis and processing system 100. The client systems 30 may include a browser for accessing information provided by the host system 10 and/or communication data analysis and processing system 100 and other connected systems that offer such functionality over the Internet or any other network. The client systems 30 may additionally be or include mobile systems, such as smart phones, tablets, or other portable computing apparatus. Mobile client systems may execute downloadable applications for operating in conjunction with the communication data analysis and processing system 100. The downloadable applications may be stored in memory and executed by processors on the mobile systems and may provide a plurality of user interfaces.

The home computing systems 40 and office computing systems 50 may include mainframe computers, personal computers, desktop or laptop computing systems and the like. The computing systems 40 and 50 may execute downloadable applications for operating in conjunction with the communication data analysis and processing system 100. The downloadable applications may be stored in memory on the computing systems 40, the host system 10, or other computing systems, and may include applications for tracking employee activity.

The mobile devices 60 may include handheld devices including mobile smartphones, such as Android® phones and iPhones®, tablets, or hand-held wireless devices such as PDAs, multiprocessor systems, microprocessor-based or programmable consumer electronics, minicomputers, other handheld devices that may now be available or may in the future become available. These mobile devices 60 may be owned and issued by the organization operating the communication data analysis and processing system 100 or by a client system 30 of the communication data analysis and processing system 100. Various corporate data sources 20 described above, such as the login/logout applications, and online activity monitoring applications may be integrated with and may capture data from the mobile devices 60 to transmit to the communication data analysis and processing system 100.

The communication data analysis and processing system 100 may be operated by an organization monitoring its own resources or by on organization managing resources for multiple client organizations. Details of the communication data analysis and processing system 100 are described below with reference to FIGS. 2 and 3.

Figure 2:
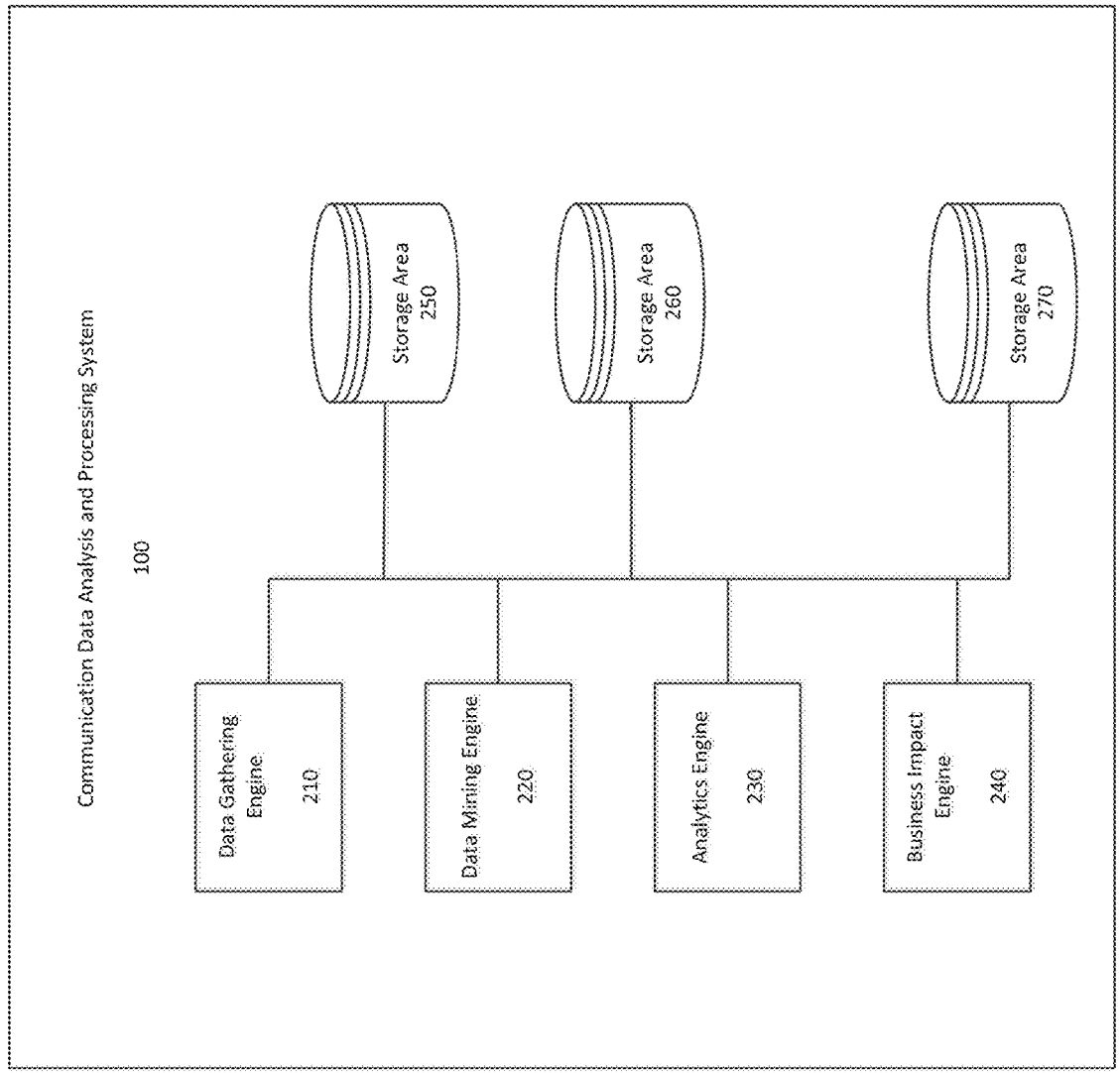
FIG. 2 is a block diagram illustrating a communication data analysis and processing computing system in accordance with an embodiment of the invention.

FIG. 2 is a block diagram illustrating a communication data analysis and processing computing system 100 in accordance with an embodiment of the invention. The communication data analysis and processing system 100 may include a data gathering engine 210, data mining engine 220, analytics engine 230 and business impact engine 240. The communication data analysis and processing system 100 may additionally include multiple storage areas 250, 260, and 270. The components may be independent computing systems or may be or include software modules stored in a computer memory structure and accessed and executed by one or more computer processors to perform multiple functions. Output from each of the software modules or computing systems may be shared and utilized by other software modules and computing systems illustrated in accordance with embodiments of the invention.

The data gathering engine 210 collects data generated from the corporate sources and digital devices as set forth above. The data gathering engine 210 may include or be incorporated in a computer system for receiving and processing large amounts of data across disparate file management systems. In one preferred embodiment of the invention, the data gathering engine 210 receives and processes data across disparate file management systems with a distributed file data management system such as Hadoop®. Those of ordinary skill in the art will appreciate that other distributed file data management systems such as Spark®, HDCC®, and Storm® may be used to receive and process data across disparate file management systems. The data gathering engine 210 executes "extract, transform, and load" ("ETL") procedures to gather data from the storage area 250. The data may include data from disparate digital data tools such as the systems shown in FIG. 1. The data includes information collected from communications data such as written and voice communications. Using ETL procedures, data gathering engine 210 may then synthesize the data for combining into the data storage area 260.

The data may be structured, semi-structured, and unstructured data from the database 250 and the ETL procedures performed by the data gathering engine 210 may include parsing unstructured data. For example, the data gathering engine 210 may parse unstructured data, such as logs of internet traffic or firewall logs. Using parsed data, data gathering engine 210 may aggregate the data for combining and storing in another data storage area 260 or another portion of the data storage area 250.

The data mining engine 220 may be or include a computer system enabled to perform exploratory data analysis of the data stored in data storage area 260. According to some embodiments, exploratory data analysis may include performing statistical methods, pattern recognition methods, machine learning, data mapping, and similar data analysis methods to the data to determine undiscovered patterns and hidden relationships between the employees and employers.

According to one embodiment of the invention, the exploratory data analysis may establish data maps, determine relationships between data variables and outputs, determine information flow, and identify information content. For example, in an email communication, the data mining engine 220 may mine data from the "to" and "from" fields and from the subject line. The data mining engine 220 may further consider time, date, and characteristics of the text and/or attached document.

The data mining engine 220 may further analyze the data by performing text searches. For example, an enterprise may analyze the data to determine if there are any employees with a particular skill set, such as Javascript. The data mining engine 220 may search the various communications data sources, such as e-mail, voicemail, and instant messaging, to determine which employees share or exchange information related to Javascript. According to some embodiments of the invention, the data mining engine 220 may perform text searches that include Boolean operators, wildcards, and proximity operators.

According to one embodiment of the invention, the data mining engine 220 may implement a distributed file data management system such as Hadoop, similar to the data gathering engine 210 described above. In other embodiments of the invention, the processing engine may be a Massively Parallel Processing ("MPP") system, such as Greenplum®, Netezza®, or Vertica®. The data mining engine 220 is enabled to generate exploratory data based on the structured data stored in the data storage area 260. The data mining engine 220 may additionally generate exploratory data based on raw data stored in the storage area 250.

In one aspect of the invention, data mining engine 220 is further enabled to eliminate ambiguity in the structured data set for improving accuracy of the exploratory data. As explained below, the data mining engine 220 may compare data from multiple sources, such as email, voicemail, and instant messaging from the storage area 250 or from other storage areas to disambiguate the data. As explained in more detail below, one advantage to disambiguating the data is to improve the accuracy of the exploratory data generated by the data mining engine 220.

The analytics engine 230 may be, include, or be incorporated in a computer system enabled to perform confirmatory data analysis of the data in the data storage area 260. The analytics engine 230 performs confirmatory data analysis by performing qualitative and quantitative techniques to suggest hypotheses, outliers, and patterns between input and output variables. The hypotheses, outliers, and patterns may be based on either exploratory data generated by the data mining engine 220, the data storage area 260, or both. According to some embodiments of the invention, the analytics engine 230 may analyze the data by performing text searches, in the same manner as described above. For example, the analytics engine may perform a text search of the data to determine if there are any employees with a particular skill set, such as Javascript. Whereas the data mining engine 220 may search the various communications data sources to discover hidden relationships between employees and the word "Javascript," the analytics engine 230 analyzes the communications data to generate hypotheses explaining why the term Javascript appears in employee communications.

Similarly to the data mining engine 220, according to one embodiment of the invention, the analytics engine 230 may implement a distributed file data management system such as Hadoop, similar to the data gathering engine 210 described above. In other embodiments of the invention, the processing engine may be a Massively Parallel Processing ("MPP") system, such as Greenplum®, Netezza®, or Vertica®. The analytics engine 230 is enabled to generate confirmatory data based on the structured data stored in data storage 260. In other embodiments of the invention, the analytics engine 230 may additionally generate confirmatory data based on raw data stored in raw data storage area 250.

In one aspect of the invention, analytics engine 230 eliminates ambiguity in the structured data set for improving accuracy of conclusions and hypotheses. As described in more detail below, the analytics engine 230 may compare data from multiple sources and multiple data sets from data sources to disambiguate the data. An important advantage to disambiguating the data is improving the accuracy of the analysis generated by the analytics engine 230. Moreover, storing data from disparate sources into structured data facilitates businesses' ability to disambiguate data across different sources. That is, in embodiments of the invention, businesses may disambiguate employee data by comparing data from disparate sources, despite the differences in the structures and formats of the data. By aggregating the data into structured data, embodiments of the present invention improve a business's ability to compare and disambiguate different sources of data.

Business impact engine 240 may be incorporated in, be, or include a computer system enabled to assess the business impact of the exploratory and confirmatory data generated by data mining engine 220 and analytics engine 230. That is, the business impact engine 240 may determine how the hidden relationships, patterns, outliers, and developed hypotheses generated by the data mining engine 220 and analytics engine 230 can be used to assess the potential risks and efficiency opportunities within an enterprise. The business impact engine 240 quantifies business impacts based on the confirmatory data and automates business processes based on the quantified business impacts. The business impact engine 240 may store information in the data storage areas.

Specifically, the business impact engine 240 allows enterprises to discover areas of previously unperceived risk, validate existing areas of concern, or confirm the efficacy of existing risk mitigation measures. In accordance with one embodiment of the invention, the impact on risk may include assessing how the data impacts an employee's obligations concerning confidentiality or conflicts of interests. That is, an enterprise may be subject to external confidentiality rules, or conflict of interest rules restricting how information is shared, and the business impact engine 240 may determine whether an employee poses a risk to violate these obligations. For example, a trading firm may be subject to laws or regulations restricting what information traders can communicate and to whom they can communicate the information to. The data mining engine 220 and analytics engine 230 may map the people each trader is communicating with, the content of those communications, and the hypotheses of whether each trader is communicating sensitive information in a prohibited manner. The business impact engine 240 may then assess whether this communication rises to the level of a breach of confidentiality or conflict of interest, and thus, presents a significant risk to the enterprise. According to one aspect of the invention, the business impact engine 240 is further enabled to automatically implement processes to mitigate risks. For example, if a trader has been determined to be a high risk threat to confidentiality, the business impact engine may automatically block or censor email and other communications from the trader.

Assessing the impact on risk may include assessing how the data impacts the enterprise's miscommunication of information or withholding of information. Similarly to the assessment of confidentiality or conflicts of interest discussed above, the business impact engine 240 may assess the risk associated with communication being improperly withheld or communicated to the wrong person. The impact on risk may include assessing how the data impacts an employee's behavioral restrictions. For example, an employee may be subject to guidelines or rules governing their behavior, such as rules prohibiting inappropriate office behavior, or harassment by employees or their superiors. The data mining engine 220 and analytics engine 230 may generate data maps of the superiors of each employee, the content of communications between the employees and superiors, and the hypotheses of whether each employee is communicating information indicative of inappropriate behavior or harassment. The business impact engine 240 may then assess whether this communication rises to the level of a breach of the employee's behavioral restrictions, and thus, presents a significant risk to the enterprise. According to one aspect of the invention, the business impact engine 240 is further enabled to automatically implement processes to mitigate this risk. For example, the business impact engine 240 may automatically block or censor email and other communications from an employee to a superior deemed to be in violation of the behavioral rules.

In accordance with another aspect of the invention, the business impact engine 240 may use information generated by the data mining engine 220 and the analytics engine 230 to identify inefficiencies in an enterprise. According to one aspect of the invention, the business impact engine 240 assesses inefficiencies by revealing discrepancies between formal and informal business flow processes. In another aspect of the invention, the business impact engine 240 assesses inefficiencies by revealing discrepancies between the formal enterprise hierarchy (e.g., a department's organization chart), and the informal enterprise hierarchy (e.g., the way that skills and/or authority is actually allocated within a department). For example, a department within an enterprise may have an organization chart specifying a pre-defined allocation of skills and/or hierarchy of authority. However, the business impact engine 240 may determine that a department's organization chart does not accurately reflect the actual allocation of skills within the department, and therefore, is inefficient.

The data storage areas 250, 260, and 270 may be or include a computer memory structure capable of storing data and may include one or more databases. The data storage areas 250, 260, and 270 may store data gathered from the various sources described above with respect to FIG. 1. This data may be structured, semi-structured, or unstructured. The data storage areas 250, 260, and 270 may include file systems and databases for storing large amounts of data. For example, the data storage areas may include HP 3PAR StoreServ® Storage systems. Those of ordinary skill in the art will appreciate that other computer storage systems for storing large amounts of data may be implemented. Data stored in the data storage areas 250, 260, and 270 may be managed and communicated with an Object-Relational Database Management System, such as Postgre® or other Object-Relational Database Management Systems that are known in the art. Multiple data storage areas may have different structures and store different types of data. For example, unstructured data may be stored separately from cleansed and structured data.

A database in the data storage area 270 may be used to automate processes based on the decisions generated by the business impact engine 240. As explained above, the database may be used to store updated employee skill set information. The database in the data storage area 270 may be a database similar to database in storage area 250. Automatically implementing processes based on business impact engine decisions allows enterprises to achieve highly accurate and up-to-date records of employees. For example, automatically updating records of employee skill sets avoids relying on employees to update this information themselves; employees seldom take the initiative to update these records of information.

Efficiency and risk business impacts are exemplary business impacts and those of ordinary skill in the art will appreciate that the business impact engine 240 may use the data generated by the data mining engine 220 and analytics engine 230 to assess other impacts on an enterprise.

Those of ordinary skill in the art will appreciate that the data mining engine 220, analytics engine 230, and business impact engine 240 may be implemented in various configurations of computer systems. For example, in one embodiment, the data mining engine 220, analytics engine 230, and business impact engine 240 may be implemented on the same computer system. In another embodiment, the data mining engine 220, analytics engine 230, and business impact engine 240 may each be implemented on a separate computer system.

Figure 3:
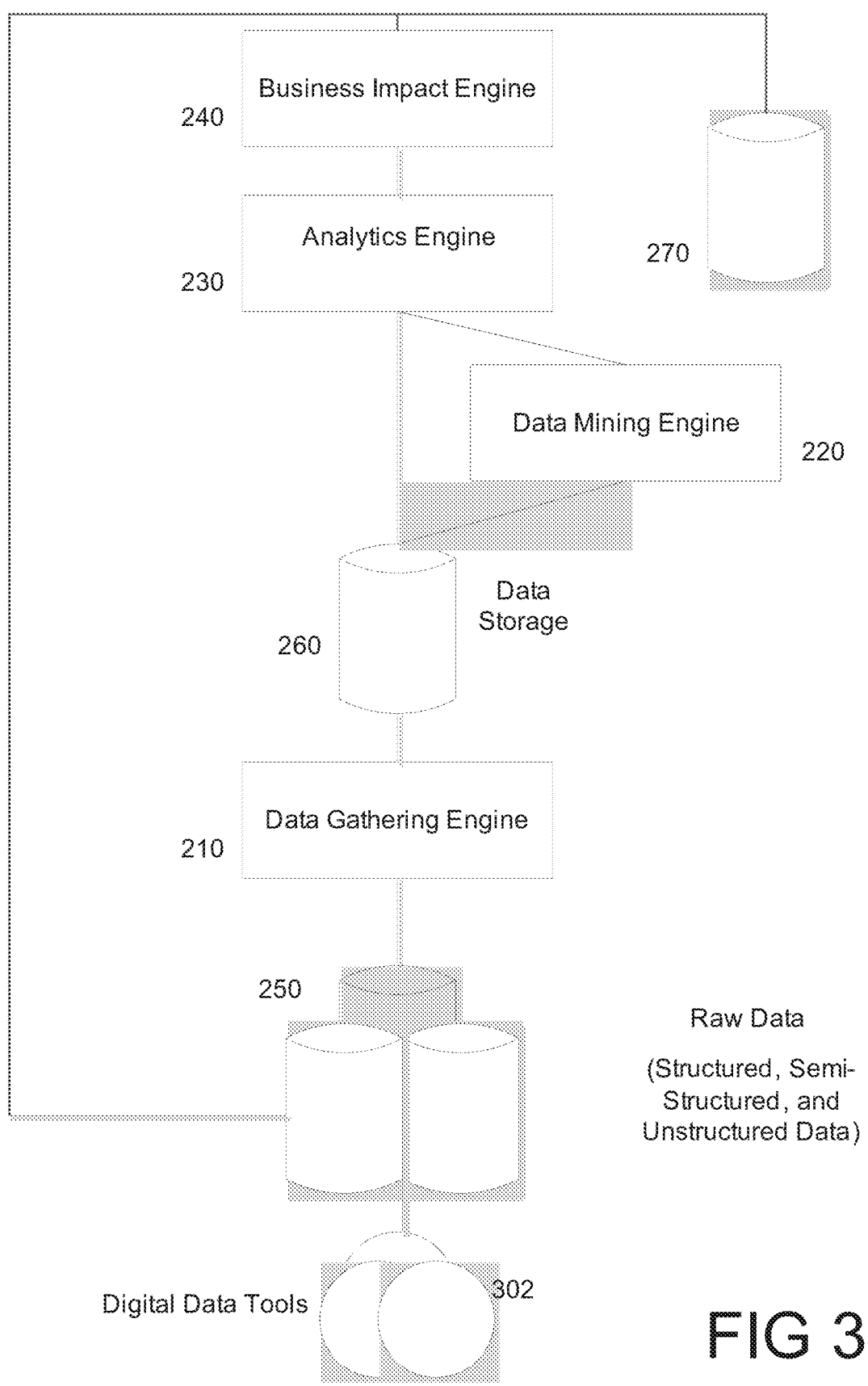
FIG. 3 is a workflow diagram illustrating data flow in accordance with an embodiment of the invention.

FIG. 3 is a workflow diagram illustrating interaction between the components of the system shown in FIG. 2. The illustrated work flow implements procedures to minimize employee-related risks and maximize operational efficiencies based on enterprise communications information. Data is acquired at the communication data analysis and processing system through digital data tools 302. These digital data tools 302 may include the connected employee computing systems and applications running on these systems as illustrated and described above with respect to FIG. 1. From the digital data tools 302, the data is directed to the data storage area 250. In embodiments of the invention, the data storage area 250 includes a storage system for storing structured, semi-structured and unstructured raw data. Three separate databases or any other number of databases may be provided to accomplish this goal.

From the storage area 250, the above-described data gathering engine 210 gathers the data and combines it into the data storage area 260 applying data cleansing and data summarization logic. The data mining engine 220 performs exploratory data analysis on the data to generate exploratory data, such as undiscovered patterns and hidden relationships. The analytics engine 230 processes the exploratory data generated by the data mining engine 220, by performing confirmatory data analysis. The analytics engine 230 performs confirmatory data analysis to generate confirmatory data such as business hypotheses. The business impact engine 240 quantifies business impacts based on the confirmatory data and automates business processes based on the quantified business impacts. The business impact engine 240 may store information in any of the above described databases.

According to embodiments of the invention, the digital data tools 302 may be tools that enable employees to directly communicate information with each other (i.e., digital collaboration tools). In accordance with one embodiment of the invention, a digital collaboration tool may be a communication device, such as a phone, radio, intercom, teleconference system, videoconference system, or similar computer device enabled to communicate over a network. In accordance with another embodiment of the invention, the digital collaboration tool may be a software application running on a computer device for communicating over a network. These applications may include an e-mail or calendar application such as MS Outlook®, video conference application such as Adobe Connect®, screen sharing applications such as WebEx®, voicemail applications, or the Communicator Instant Messaging application.

According to another embodiment of the invention, the digital tools 302 may be social collaboration tools that indirectly exchange data between employees. In one aspect of the invention, whereas direct communication tools facilitate the transfer and exchange of communication between employees, a social collaboration tool may indirectly enable employees to exchange data by providing the information needed to establish direct communication. For example, a social collaboration tool may include a contact or distribution list that employees use to establish communication with each other. In another aspect of the invention, a social collaboration tool may indirectly enable employees to exchange data by enabling employees to broadcast information over a network. For example, a social collaboration tool may include a network application, such as an internal or external forum, or JP Morgan's Synapse management portal application. In yet another aspect of the invention, a social collaboration tool may indirectly enable employees to exchange data by enabling employees to share or exchange media over web-enabled social media tools, such as LinkedIn®.

According to other embodiments of the invention, the digital data tools 302 may be devices or software that provide contextual or linking data about employees in an enterprise. That is, this data may be data that provides information about the employee or enterprise that may not be communicated between employees. In one aspect of the invention, this data may be data defined by the enterprise. For example, this data may include information about the employee's roles and duties in the enterprise's organizational chart, the employee's personal information such as contact information, the employee digital access rights, the employee's location data, or the enterprise's governance structures. In another aspect of the invention, this data may be data that is collected from the employee. For example, this information may include information volunteered by employees, such as via a survey, or information that is monitored by employers, such as information about system usage, information collected from embedded monitoring, or authentication information such as Single-Sign-On.

Digital data tools 302 may be provided to employees to facilitate collaboration and communication amongst each other. According to one aspect of the invention, these tools may store information about these communications in any of the above-described databases. The information may include records of the content that was communicated between employees, as well as metadata that provides contextual information about each particular record of communication. For example, a database storing e-mail communication information may store a copy of the content of an email, as well as contextual information of the email such as sender, recipient, CC/BCC, date/time, attachment name, and attachment type. As another example, a database storing voicemail information may store a recording of a voicemail as well as contextual information about the voicemail, such as caller, recipient, date/time, and duration.

The provided databases 250, 260, and 270 are computer storage systems for storing large amounts of data including the data captured from the digital data tools 302. According to one embodiment of the invention, database 250 may store direct communications data such as e-mail communications data; database 260 may store indirect communications information; and database 270 may store contextual and linking data. Other alternative configurations are within the scope of the invention.

As illustrated in FIG. 3, information captured from digital data tools 302 may be routinely recorded throughout the ordinary course of business and corporate activities and stored in the database 250. That is, communications such as e-mail, may be archived and stored in any of the databases 250, 260, and 270 as part of an enterprise's routine maintenance. One advantage to storing data as part of an enterprise's ordinary operation is that the information may provide inherent insight into a broad spectrum of processes. That is, these digital communications cover numerous aspects of daily employee interaction throughout an enterprise.

Another advantage to obtaining data from digital data tools 302 is that the nature of these communications enables enterprises to obtain an unfiltered and unbiased window into an employee's typically workplace communication. Traditional methodologies, such as circulating surveys, are self-regulated by the employee, and thus would often lead to responses that were biased or selective, resulting in inaccurate data. In contrast, data obtained from digital data tools 302 includes empirical data that improves the accuracy of employee data, providing enterprises with more reliable bases for making decisions. Whereas there is relatively little accountability ensuring the accuracy of information voluntarily provided in surveys, information obtained from digital data tools 302 provides an accurate depiction of how employees actually operate.

As set forth above, the data gathering engine 210 is a computer system for receiving and processing large amounts of data across disparate file management systems. In one preferred embodiment of the invention, the data gathering engine receives and processes data across disparate file management systems with a distributed file data management system such as Hadoop®. Those of ordinary skill in the art will appreciate that other distributed file data management systems such as Spark®, HDCC®, and Storm® may be used to receive and process data across disparate file management systems. The data gathering engine 210 executes "extract, transform, and load" ("ETL") procedures to gather data from databases 250, 260, and 270. The data may include data from disparate digital data tools 302. Using ETL procedures, data gathering engine 210 may then synthesize the data for combining into the data storage area 260.

The data storage area 260 receives aggregated data processed by data gathering engine 210. In one aspect of the invention, the data gathering engine 210 aggregates the different structures of data to be combined into a single data structure. For example, data from an employee's e-mail records may be combined with voicemail records from an employee's telephone. According to one embodiment of the invention, the data is transformed into tables having relational fields. One advantage to aggregating the data into a single data structure is that employers may analyze data from several different sources. Another advantage to aggregating data into a single data structure is that employers may resolve and eliminate ambiguities in the data by comparing data across different sources, as described in more detail below.

From the data storage area 260, the data mining engine 220 is enabled to perform exploratory data analysis of the stored data. According to some embodiments, exploratory data analysis may include performing statistical methods, pattern recognition methods, machine learning, data mapping, and similar data analysis methods to the data to determine undiscovered patterns and hidden relationships about the employees and employers. According to one embodiment of the invention, the exploratory data analysis may establish data maps, determine relationships between data variables and outputs, determine information flow, and identify information content. As set forth above, the data mining engine 220 may analyze the data by performing text searches. For example, an enterprise may analyze the data to determine if there are any employees with a particular skill set, such as Javascript. The data mining engine may search the various communications data sources, such as e-mail, voicemail, and instant messaging, to determine which employees share or exchange information related to Javascript. According to some embodiments of the invention, the data mining engine may perform text searches that include Boolean operators, wildcards, and proximity operators. The data mining engine 220 may further be enabled to eliminate ambiguity in the structured data set for improving accuracy of the exploratory data. As explained below, the data mining engine 220 may compare data from multiple sources, such as email, voicemail, and instant messaging from databases 250 to disambiguate the data. As explained in more detail below, one advantage to disambiguating the data is to improve the accuracy of the exploratory data generated by the data mining engine 220.

According to one embodiment of the invention, the data mining engine 220 may analyze the map, flow and concentrations of communication. For example, the data mining engine 220 may mine the data in data storage 260 to discovery that a substantial volume of information flows through a particular employee. The analytics engine 230 develops hypotheses to explain the possible reasons the particular employee communicates such a substantial concentration of information. For example, the analytics engine 230 may suggest that the particular employee is important to a particular business process, or that the particular employee has critical or key information about a particular subject, or that the particular employee is inefficient.

As illustrated in FIG. 3, the analytics engine 230 operates in conjunction with the data mining engine 220 to perform confirmatory data analysis of the data in the data storage area 260 and data generated by the data mining engine 220. The analytics engine 230 performs confirmatory data analysis by performing qualitative and quantitative techniques to suggest hypotheses, outliers, and patterns between input and output variables. The hypotheses, outliers, and patterns may be based on either exploratory data generated by the data mining engine 220, the data storage area 260, or both. According to some embodiments of the invention, the analytics engine 230 may analyze the data by performing text searches, in the same manner as described above.

In operation, the data mining engine 220 may analyze the map, flow and concentrations of communication. For example, the data mining engine 220 may mine the data in data storage 260 to discover that a particular employee has a substantial volume of information flowing through them. The analytics engine 230 develops hypotheses to explain the possible reasons the particular employee communicates such a substantial concentration of information. For example, the analytics engine 230 may suggest that the particular employee is important to a particular business process, or that the particular employee has critical or key information about a particular subject, or that the particular employee is inefficient.

Based on the operation of the data mining engine 220 and the analytics engine 230, the business impact engine 240 is enabled to assess the business impact of the exploratory and confirmatory data. That is, the business impact engine 240 may determine how the hidden relationships, patterns, outliers, and developed hypotheses generated by the data mining engine 220 and analytics engine 230 can be used to assess the potential risk mitigation and efficiency optimization opportunities within an enterprise.

As illustrated, the business impact engine 240 is connected with the analytics engine 230 and the database 270 may determine how the hidden relationships, patterns, outliers, and developed hypotheses generated by the data mining engine 220 and analytics engine 230 can be used to assess and mitigate risks in an enterprise. Specifically, the business impact engine 240 allows enterprises to discover areas of previously unperceived risk, validate existing areas of concern, or confirm the efficacy of existing risk mitigation measures. In accordance with one embodiment of the invention, the impact on risk may include assessing how the data impacts an employee's obligations concerning confidentiality or conflicts of interests. That is, an enterprise may be subject to external confidentiality rules, or conflict of interest rules restricting how information is shared, and the business impact engine may determine whether an employee poses a risk to violate these obligations. For example, a trading firm may be subject to laws or regulations restricting what information traders can communicate and to whom they can communicate the information to. The data mining engine 220 and analytics engine 230 may map the people each trader is communicating with, the content of those communications, and the hypotheses of whether each trader is communicating sensitive information in a prohibited manner. The business impact engine may then assess whether this communication rises to the level of a breach of confidentiality or conflict of interest, and thus, presents a significant risk to the enterprise. According to one aspect of the invention, the business impact engine is further enabled to automatically implement processes to mitigate risks. For example, if a trader has been determined to be a high risk threat to confidentiality, the business impact engine may automatically block or censor email and other communications from the trader.

In accordance with another embodiment of the invention, the impact on risk may include assessing how the data impacts the enterprise's miscommunication of information or withholding of information. Similarly to the assessment of confidentiality or conflicts of interest discussed above, the business impact engine 240 may assess the risk associated with communication being improperly withheld or communicated to the wrong person.

Assessing the impact on risk may include assessing how the data impacts an employee's behavioral restrictions. For example, an employee may be subject to guidelines or rules governing their behavior, such as rules prohibiting inappropriate office behavior, or harassment by employees or their superiors. The data mining engine 220 and analytics engine 230 may generate data maps of the superiors of each employee, the content of communications between the employees and superiors, and the hypotheses of whether each employee is communicating information indicative of inappropriate behavior or harassment. The business impact engine may then assess whether this communication rises to the level of a breach of the employee's behavioral restrictions, and thus, presents a significant risk to the enterprise. According to one aspect of the invention, the business impact engine is further enabled to automatically implement processes to mitigate this risk. For example, the business impact engine may automatically block or censor email and other communications from an employee to a superior deemed to be in violation of the behavioral rules.

Additionally, the business impact engine 240 may use information generated by data mining engine 220 and the analytics engine 230 to identify inefficiencies in an enterprise. According to one aspect of the invention, the business impact engine 240 assesses inefficiencies by revealing discrepancies between formal and informal business flow processes. In another aspect of the invention, the business impact engine 240 assesses inefficiencies by revealing discrepancies between the formal enterprise hierarchy (e.g., a department's organization chart), and the informal enterprise hierarchy (e.g., the way that skills and/or authority is actually allocated within a department). For example, a department within an enterprise may have an organization chart specifying a pre-defined allocation of skills and/or hierarchy of authority. However, the business impact engine 240 may determine that a department's organization chart does not accurately reflect the actual allocation of skills within the department, and therefore, is inefficient.

For example, a department may specify that a particular employee (e.g., Employee A) as Chief Javascript Engineer, because the enterprise believes Employee A has the most knowledge and skill of Javascript when compared to other employees. However, the business impact engine 109 may determine that Employee A is not as qualified in Javascript (or any other skill set) as another employee (e.g., Employee B). As explained above, the data mining engine 220 and analytics engine 230 may be used to identify employees with particular skill sets, such as Javascript. Data mining engine 220 and analytics engine 230 may suggest that Employee B is much more skilled in Javascript than Employee A. Business impact engine 240 may then compare the data generated by data mining engine 220 and analytics engine 230 to the organization chart and determine that it would be more efficient to direct all work or questions related to Javascript to Employee B instead of Employee A.

Assessing the impact on efficiency may further include assessing how the data impacts an employee's human resources taxonomy. For example, the business impact engine 240 may determine that Employee B's expertise in Javascript should result in a promotion in status to Chief Javascript Engineer, and increase in pay grade.

According to one aspect of the invention, the business impact engine 240 is further enabled to automatically implement processes that address these inefficiencies. For example, if the business impact engine 240 determines that Employee B should be Chief Javascript Engineer, then the business impact engine 240 may automatically update department organizational charts, and automatically change Employee B's pay grade or generate a recommendation for performance of this function. As another example, business impact engine 240 may automatically update a database, such as database 270, that stores information about each employees skill set; Employee B's skill set information in the database may be automatically updated to include Javascript.

In yet another aspect of the invention, the business impact engine 240 may identify inefficiencies by identifying weaknesses or practice areas that lack experience altogether. For example, while searching for employees with Javascript skills, the business impact engine 240 may determine that no employees have experience or skill in C++ and generate a job description for a C++ expert position.

In embodiments of the invention, analysts may enter queries into a user interface through client systems 30 or host system 10 and based on output from the communication data analysis and processing system 100, the business impact engine 240 may provide a visual response to the analyst queries. Based on the research and analysis conducted by the other components, the business impact engine 240 may propose reconfigurations of resources to enhance efficiency and/or reduce risk within the business structure.

In one aspect of the invention, the business impact engine 240 is enabled to provide employers with a behavior-based early warning system. That is, the business impact engine 240 may detect trends in the data that serve as indicators for anticipating changes in employee behavior. The business impact engine 240 may further generate reports based on the analytics.

A database in the data storage area 270 may be used to automate processes based on the decisions generated by the business impact engine 240. As explained above, the database may be used to store updated employee skill set information. Automatically implementing processes based on business impact engine decisions allows enterprises to achieve highly accurate and up-to-date records of employees. For example, automatically updating records of employee skill sets avoids relying on employees to update this information themselves; employees seldom take the initiative to update these records of information.

Efficiency and risk business impacts are exemplary business impacts and those of ordinary skill in the art will appreciate that the business impact engine may use the data generated by the data mining engine 220 and analytics engine 230 to assess other impacts on an enterprise.

Those of ordinary skill in the art will appreciate that the data mining engine 220, analytics engine 230, and business impact engine 240 may be implemented in various configurations of computer systems. For example, in one embodiment, the data mining engine 220, analytics engine 230, and business impact engine 340 may be implemented on the same computer system. In another embodiment, the data mining engine 330, analytics engine 230, and business impact engine 240 may each be implemented on a separate computer system.

Figure 4:
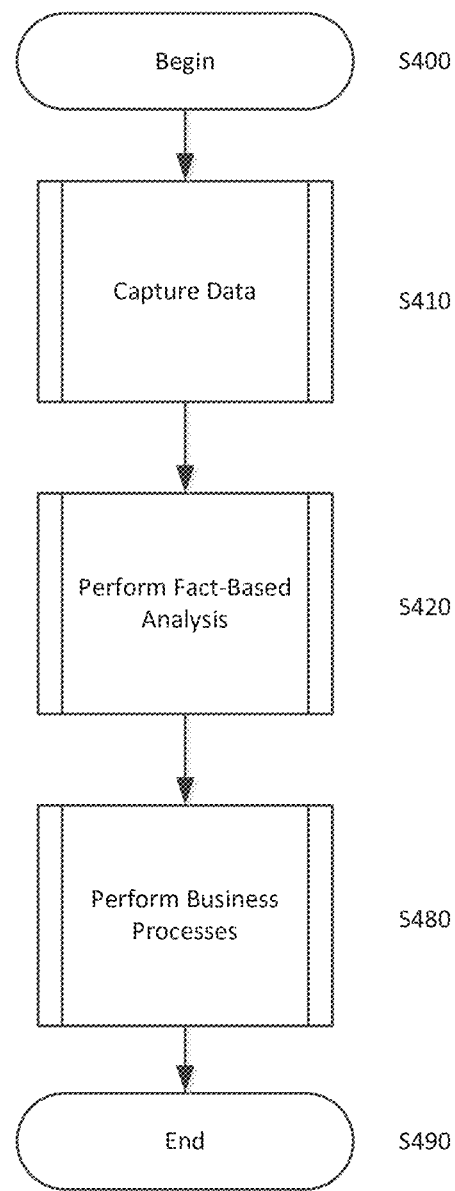
FIG. 4 is a flow chart illustrating a method for implementing communication data analysis and processing in accordance with embodiments of the invention.

FIG. 4 is a flow chart illustrating a method for implementing communication analysis and processing in accordance with embodiments of the invention. The process begins in S400 and the data capture procedure occurs in S410. The system performs fact-based analysis on the captured data in S420 and performs business processes based on the analysis in S480. The process ends in S480.

As explained above with respect to FIG. 3, the data capture process of S410 may include gathering the data from various digital devices and data sources and storing the gathered data. Using ETL procedures, data gathering engine may then synthesize the data for combining into a data storage area. The data are generated and collected throughout the course of daily business and corporate activities, providing inherent insight into a broad spectrum of processes. The data may be structured, semi-structured, and unstructured data from the database and the ETL procedures performed by the data gathering engine may include parsing unstructured data. For example, the data gathering engine may parse unstructured data and using parsed data, the data gathering engine may aggregate the data for combining and storing in another data storage area 260 or another portion of the data storage area The fact-based analysis may include multiple steps as will further be described with relation to FIG. 6 below. Finally, the business processes performed in S480 are determined and implemented by the business impact engine described above and are further described with respect to FIG. 7.

Figure 6:
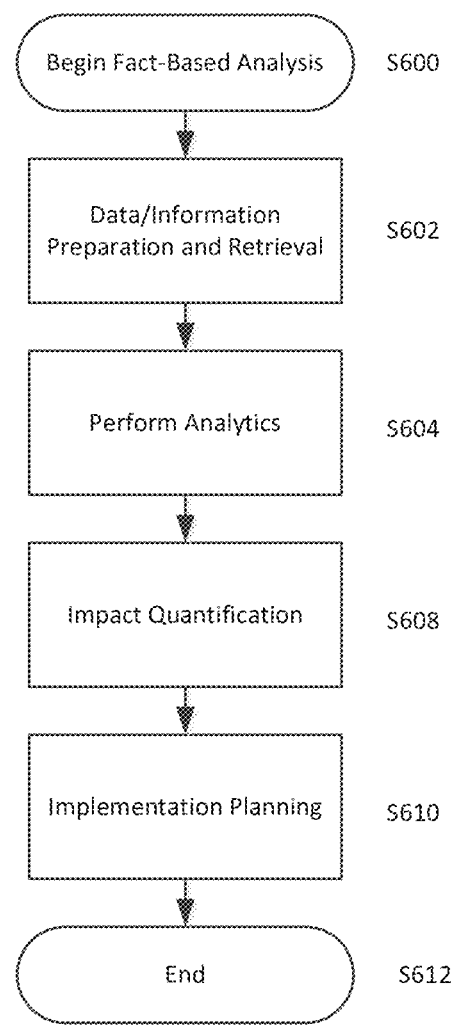
FIG. 6 is a flow chart illustrating a process for fact-based communication analysis in accordance with an embodiment of the invention.

With respect to the fact-based analysis of S420, FIG. 6 is a flow chart illustrating the fact-based analysis procedures beginning in S600. In S602, the system performs data/information preparation and retrieval or data mining. As described above with respect to FIGS. 2 and 3, this process may be executed by the data mining engine and the analytics engine.

Analytics are then performed on the synthesized data in S604. S604 may be a procedure including multiple steps such as data mining, analysis, and disambiguation, as will be further described herein. The system then mines the synthesized data to generate exploratory data. Exploratory data may be data that reveals undiscovered patterns and hidden relationships about the enterprise and its employees as described above. Data mining may include performing statistical methods, pattern recognition methods, machine learning, data mapping, and similar analytical methods to the data to generate exploratory data. According to another embodiment of the invention, data may be mined by performing text searches. According to one embodiment of the invention, the exploratory data analysis may generate data maps, determine relationships between data variables and outputs, determine information flow, and identify information content, as described above.

Further, in S604, analytics are performed on the synthesized data created, the exploratory data generated or both, to generate confirmatory data. As described above, confirmatory data may be generated by performing qualitative and quantitative techniques to examine relationships and suggest hypotheses, outliers, and patterns between the input and output variables. According to some embodiments of the invention, the analytics may be performed by performing text searches, in the same manner as described above.

Also, in S604, the data generated in may be disambiguated. That is, ambiguity concerning the hypotheses, outliers, and patterns in the data may be eliminated. One advantage to eliminating data ambiguity is improving the accuracy of the hypotheses. Enterprises typically do not rely on data gathered from a single data source to generate the exploratory and confirmatory data, because the data typically suffers from multiple ambiguities. For example, enterprises may be reluctant to rely on voicemail information alone to determine whether an employee has a particular skill set, such as Javascript. A particular employee may receive numerous voicemails discussing Javascript that were actually misdials or wrong numbers; that particular employee may, in fact, have no Javascript skills. However, by comparing the voicemail data to other data sources, such as email data, an enterprise may resolve ambiguities and improve the accuracy of the exploratory and confirmatory data.

In accordance with one aspect of the invention, ambiguity in the data is resolved, i.e., disambiguated, by comparing data across different data sources. For example, if it is unclear from the voicemail data whether an employee is skilled in Javascript, the voicemail data may be cross-checked with email data, or instant messaging data to triangulate whether the employee was has a particular skill set.

Thus, in S604, the system performs relationship discovery and hypothesis development by disambiguating, zeroing in on areas of interest, mapping relationships, analyzing data flow and content, identifying root causes, and performing population segmentation. The system facilitates a top-down analysis to proceed from observed phenomenon to root cause.

In S606, the system further develops the hypotheses based on the mapping, relationships, data flow analysis, and data content. These hypotheses may relate to risk and efficiency with respect to daily corporate activities and relationships or overall organizational structure. In S608, the system assesses or quantifies the potential impact of these hypotheses on the organization. Finally, in S610, the system develops an implementation plan based on the hypotheses and impact quantification. For example, for hypotheses relating to significant organizational impact, the system may develop an implementation plan to reduce risk or maximize efficiency.

Returning to FIG. 4, in S480, the system performs business processes or executes the implementation plan. The execution may include such features as process automation, process re-engineering, formalization of informal organization, risk mitigation measures, or even enhanced collaboration tools.

Figure 5:
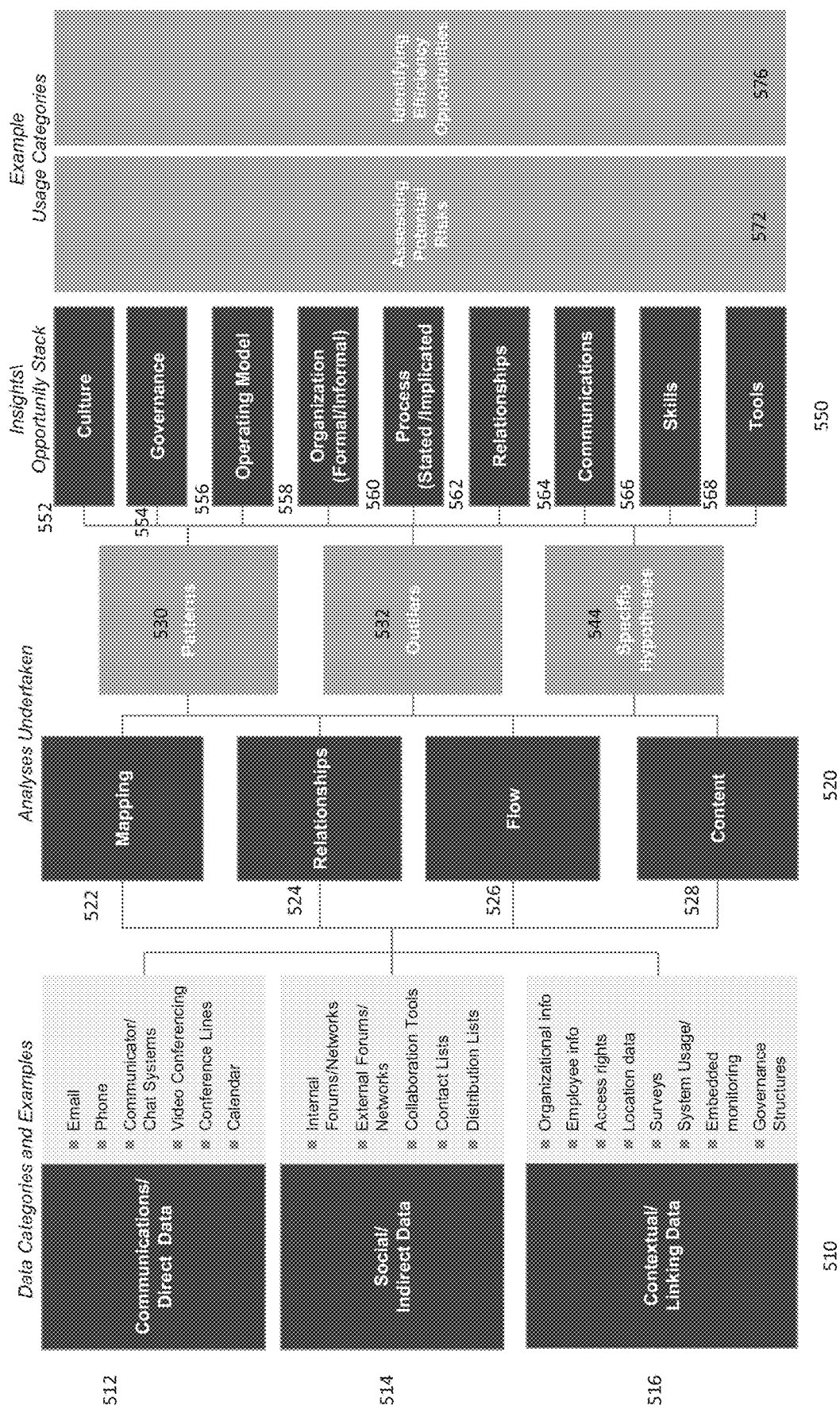
FIG. 5 is a workflow diagram illustrating a detailed method for implementing communication data analysis and processing in accordance with an embodiment of the invention.

FIG. 5 is a workflow diagram illustrating a detailed method for implementing communication analysis and processing in accordance with an embodiment of the invention. FIG. 5 illustrates the information initially collected by the system at 510. The system may include communications and direct data 512, social or indirect data 514, and contextual or linking data at 516. The communications and data 512 may include email data, phone data, chat systems data, video conferencing data, conference line data, and calendar data. Other sources of data may also be included. The social or indirect data 514 may include such sources as internal forums or networks, external forums or networks, collaboration tools, contact lists, or distribution lists. The contextual or linking data may include organization information, employee information, access rights, location data, surveys, system usage, embedded monitoring, and governance structures. Based on all of these collected data sources, the system undertakes analyses using algorithms and manipulation 520 to detect patterns 530, outliers 532, and formulate specific hypotheses 533. The analyses may include mapping 522, relationships 524, flow 526, and content 520.

The system applies the analysis to specific areas of opportunity or an insight/opportunity stack 550. The areas may include culture 552, governance 554, operating model 556, organization 558, process 560, relationships 562, communications 564, skills 566, and tools 568. In each of these areas, the system may assess potential risks 522 and identify efficiency opportunities 576. Business processes are then developed and implemented based on this analysis.

The business impact of the exploratory and confirmatory data generated is determined. Determining business impacts based on exploratory and confirmatory data may include determining how the hidden relationships, patterns, outliers, and developed hypotheses generated can be used to assess potential risks 572 and identify efficiency opportunities 576 within an enterprise, as described above. For example, the data may be used to assess whether communications by an employee rise to the level of a breach of confidentiality or conflict of interest, and thus, presents a significant risk to the enterprise. As another example, the data may be used to determine that a department's organization chart does not accurately reflect the actual allocation of skills within the department, and therefore, is inefficient.

Business processes may be automated based on the business impact identified. For example, a business process that mitigates the risk of a breach of confidentiality or conflict of interest may be implemented automatically. Thus, if a trader has been determined to be a high risk to confidentiality, that trader's email, phone, and instant messaging communications may be automatically blocked or censored. As another example, a business process that addresses inefficiencies in a department's organizational structure may be implemented automatically. Thus, if a particular employee has been determined to have the highest skill set in a particular area of expertise, the employee's status and pay grade may be automatically updated.

FIG. 7 illustrates a method for applying the analysis of the analytics engine to optimize risk mitigation and efficiency. The process begins in S700 and the system may identify risks to be addressed at S710 and efficiency issues at S740. The system may, for example, evaluate confidentiality risks as S712, information flow risks at S714, and behavioral risks at S716. Confidentiality risks may include, for example, external confidentiality risks, conflict of interest risks between multiple groups, and conflicts of interest related to information sharing. Information flow risks may include, for example, the risk of information miscommunication, the risk of withholding information. Behavioral risks may include, for example, inappropriate behavior evidenced through the collected communications data.

With respect to efficiencies, organizational efficiencies may be in the realm of corporate services, technology, or lines of business. For example, in the realm of corporate services, the system may evaluate efficiencies related to on-boarding, workforce redeployment, task orders, and other areas. Taxonomy efficiency may be evaluated in the realm of geography, status, grade, etc. Efficiency may be evaluated for internal employees, contractors, and on an international or domestic basis. With respect to efficiency, organizational functions may be evaluated at S742 and classifications may be evaluated at 746. The evaluations are consolidated at S750. At S760, the system generates recommendations based on the risk conclusions at S720 and efficiency conclusions at S760. The process ends in S770. Based on the evaluation of risk and efficiency with respect to the collected data, the system may generate impact analysis and implementation plans for reducing risk and increasing efficiencies.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones, tablets or PDAs, multiprocessor systems, microprocessor-based or programmable consumer electronics, mini-computers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as the Macintosh® OS or iOS operating systems, Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Apache™ operating system, an OpenStep™ operating system or another operating system of platform. In other embodiments, the operating system may be or include operating systems specifically adapted for mobile devices, such as the Google Android™ mobile operating system, the Mozilla Firefox™ OS mobile operating system, the RIM BlackBerry™ mobile operating system, the Apple iOS™ mobile operating system, Nokia Symbian™ or S40™ (Series 40) mobile operating systems, Microsoft's Windows Phone™, Windows 8™, or Windows RT™ operating system, the Samsung bada™ mobile operating system, the Hewlett Packard webOS™ mobile operating system, the Palm OS™ mobile operating system, the Maemo™ mobile operating system, or the MeeGo™ mobile operating system.

At a minimum, the memory includes at least one set of instructions that is either permanently or temporarily stored. The processor executes the instructions that are stored in order to process data. The set of instructions may include various instructions that perform a particular task or tasks, such as those shown in the appended flowchart. Such a set of instructions for performing a particular task may be characterized as a program, software program, software, engine, module, component, mechanism, or tool. The computer systems described above may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, Objective C, C++, COBOL, dBase, Forth, FORTRAN, Java, Modula-2, Pascal, Prolog, REXX, and/or JavaScript, for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Visitor Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, capacitive and resistive (multi-touch) touch screens, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI, for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

While particular embodiments of the invention have been illustrated and described in detail herein, it should be understood that various changes and modifications might be made to the invention without departing from the scope and intent of the invention. From the foregoing it will be seen that this invention is one well adapted to attain all the ends and objects set forth above, together with other advantages, which are obvious and inherent to the systems and methods. It will be understood that certain features and sub-combinations are of utility and may be employed without reference to other features and sub-combinations.

What is claimed is:

1. A computer-implemented method for reducing organizational risk threats and organizational inefficiencies for an organization, the computer-implemented method comprising:
   monitoring, by online activity monitoring applications, unstructured communications information from devices of employees of the organization, the online activity monitoring applications being integrated with the devices, capturing the unstructured communications information from the devices, and transmitting the unstructured communications information to a processing system;
   collecting the unstructured communications information over a network at the processing system, the unstructured communications information comprising communications data and employee activity data, the communications data comprising employee voice communications data, the employee activity data comprising employee electronic mail data captured from the online activity monitoring applications;
   managing, by the processing system, hierarchy data, the hierarchy data specifying a pre-defined allocation of skills of the employees of the organization and a hierarchy of authority;
   synthesizing the unstructured communications information using extract, transform and load (ETL) procedures to create structured data;
   mining the structured data and analyzing the structured data by searching to, from, and text fields of the employee electronic mail data to identify first patterns for particular employees and to create exploratory data exposing second patterns and relationships between the employees of the organization;
   disambiguating the exploratory data by comparing data from multiple sources to resolve ambiguities in the exploratory data and improve accuracy of the exploratory data;
   analyzing the employee electronic mail data and the employee voice communications data to identify an employee skillset, to generate confirmatory data and to generate hypotheses;
   comparing the employee electronic mail data and the employee voice communications data with the hierarchy data to verify when the employee skillset includes an ambiguity;
   determining one or more business impacts based on the hypotheses, the second patterns, the relationships, and the confirmatory data, when the employee skillset does not include the ambiguity, the one or more business impacts including at least one of the organizational risk threats or the organizational inefficiencies; and
   updating one or more employee parameters based on the one or more business impacts to reduce the at least one of the organizational risk threats or the organizational inefficiencies,
   wherein the one or more employee parameters is updated, based on the one or more business impacts, to at least one of automatically block or censor electronic mail communications from the employee.

2. The computer-implemented method of claim 1, wherein the disambiguating of the exploratory data further comprises comparing data from different sources, wherein the different sources include email, voicemail, and instant messaging.

3. The computer-implemented method of claim 1, wherein the mining of the structured data comprises establishing data maps, determining second relationships between data variables and outputs, identifying information flow characteristics, and identifying information content.

4. The computer-implemented method of claim 3, wherein the analyzing of the structured data further comprises detecting outliers.

5. The computer-implemented method of claim 1, wherein the collecting of the unstructured communications information comprises applying business rules to parse the unstructured communications information.

6. The computer-implemented method of claim 1, wherein the updating of the one or more employee parameters comprises populating a database with the exploratory data and the confirmatory data.

7. The computer-implemented method of claim 1, wherein the unstructured communications information includes direct data including email communications and telephone communications.

8. The computer-implemented method of claim 7, further comprising collecting chat system data, video conferencing data and calendar data.

9. The computer-implemented method of claim 7, wherein the unstructured communications information includes indirect communications data including collaboration tool data, internal forum data, and external forum data.

10. The computer-implemented method of claim 9, wherein the indirect communications data further includes contact lists and distribution lists.

11. The computer-implemented method of claim 1, wherein the processing system further manages contextual and linking data, the contextual and linking data including at least two of: organizational information, employee information, access rights, location data, surveys, system usage data, embedded monitoring data, or governance structures.

12. A communication data analysis and processing system comprising at least one of a data gathering engine, a data mining engine, an analytics engine, or a business impact engine, the communication data analysis and processing system further comprising a memory, the memory comprising programmed instructions stored thereon and one or more processors configured to be capable of executing the stored instructions to perform operations comprising:
    causing online activity monitoring applications to monitor unstructured communications information from devices of employees of an organization, the online activity monitoring applications being integrated with the devices, capturing the unstructured communications information from the devices, and transmitting the unstructured communications information to the communication data analysis and processing system;
    collecting the unstructured communications information over a network at the communication data analysis and processing system, the unstructured communications information comprising communications data and employee activity data, the communications data comprising employee voice communications data, the employee activity data comprising employee electronic mail data captured from the online activity monitoring applications;
    managing, by the communication data analysis and processing system, hierarchy data, the hierarchy data specifying a pre-defined allocation of skills of the employees of the organization and a hierarchy of authority;
    synthesizing the unstructured communications information using extract, transform and load (ETL) procedures to create structured data;
    mining the structured data and analyzing the structured data by searching to, from, and text fields of the employee electronic mail data to identify first patterns for particular employees and to create exploratory data exposing first patterns and relationships between the employees of the organization;
    disambiguating the exploratory data by comparing data from multiple sources to resolve ambiguities in the exploratory data and improve accuracy of the exploratory data;
    analyzing the employee electronic mail data and the employee voice communications data to identify an employee skillset, to generate confirmatory data and to generate hypotheses;
    comparing the employee electronic mail data and the employee voice communications data with the hierarchy data to verify when the employee skillset includes an ambiguity;
    determining one or more business impacts based on the hypotheses, the second patterns, the relationships, and the confirmatory data, when the employee skillset does not include the ambiguity, the one or more business impacts including at least one of the organizational risk threats or the organizational inefficiencies; and
    updating one or more employee parameters based on the one or more business impacts to reduce the at least one of the organizational risk threats or the organizational inefficiencies,
    wherein the one or more employee parameters is updated, based on the one or more business impacts, to at least one of automatically block or censor electronic mail communications from the employee.

13. The communication data analysis and processing system of claim 12, wherein the disambiguating of the exploratory data further comprises comparing data from different sources, wherein the different sources include email, voicemail, and instant messaging.

14. The communication data analysis and processing system of claim 12, wherein the mining of the structured data comprises establishing data maps, determining second relationships between data variables and outputs, identifying information flow characteristics, and identifying information content.

15. The communication data analysis and processing system of claim 14, wherein the analyzing of the structured data further comprises detecting outliers.

16. The communication data analysis and processing system of claim 14, wherein the collecting of the unstructured communications information comprises applying business rules to parse the unstructured communications information.

17. The communication data analysis and processing system of claim 12, wherein the updating of the one or more employee parameters comprises populating a database with the exploratory data and the confirmatory data.

18. The communication data analysis and processing system of claim 12, wherein the unstructured communications information includes direct data including email communications and telephone communications.

19. The communication data analysis and processing system of claim 18, further comprising collecting chat system data, video conferencing data and calendar data.

20. The communication data analysis and processing system of claim 18, wherein the unstructured communications information includes indirect communications data including collaboration tool data, internal forum data, and external forum data.

21. The communication data analysis and processing system of claim 20, wherein the indirect communications data further includes contact lists and distribution lists.

22. The communication data analysis and processing system of claim 12, wherein the communication data analysis and processing system further manages contextual and linking data, the contextual and linking data including at least two of: organizational information, employee information, access rights, location data, surveys, system usage data, embedded monitoring data, or governance structures.

* * * * *